United States Patent [19]
Gest et al.

[11] Patent Number: 5,333,247
[45] Date of Patent: Jul. 26, 1994

[54] SCROLLING TOOL FOR TEXT AND GRAPHICS IN A DISPLAY SYSTEM

[75] Inventors: Stephen B. Gest; Farrell W. Wymore, both of Austin, Tex.

[73] Assignee: International Business Machines Corporation, Armonk, N.Y.

[21] Appl. No.: 58,823

[22] Filed: May 7, 1993

Related U.S. Application Data

[63] Continuation of Ser. No. 674,423, Mar. 22, 1991, abandoned, which is a continuation of Ser. No. 204,669, Jun. 10, 1988, abandoned.

[51] Int. Cl.$^5$ ............................................. G06F 15/62
[52] U.S. Cl. .................................... 395/138; 395/155; 345/123
[58] Field of Search ................. 364/521; 395/138, 155; 340/724, 726, 721, 723, 734, 712, 700; 345/123, 124, 125

[56] References Cited

U.S. PATENT DOCUMENTS

| | | | |
|---|---|---|---|
| 4,417,239 | 11/1983 | Demke et al. | 340/709 |
| 4,437,093 | 3/1984 | Bradley | 340/726 |
| 4,555,772 | 11/1985 | Stephens | 364/900 |
| 4,633,415 | 12/1986 | Vink et al. | 364/521 |
| 4,714,918 | 12/1987 | Barker et al. | 345/123 X |
| 4,720,703 | 1/1988 | Schnarel, Jr. et al. | 340/724 |
| 4,734,689 | 3/1988 | Kurakake | 340/726 |
| 4,786,897 | 11/1988 | Takanashi et al. | 340/721 |
| 4,831,556 | 5/1989 | Oono | 364/521 |

FOREIGN PATENT DOCUMENTS 0245037 12/1985 Japan ............................ 395/138

OTHER PUBLICATIONS

Foley et al., *Fundamentals of Interactive Computer Graphics*, Addison-Wesley, 1982, pp. 78–87.
Microsoft Windows User's Guide (Version 2.0), 1987, pp. 103–105.
Fischer, "Cognitive View of Reuse and Redesign," *IEEE Software*, vol. 4 No. 4, Jul. 1987, pp. 60–72.
Bernet et al., "The 630 Multitasking Graphics Terminal," *AT&T Technical Journal*, vol. 66 No. 6, Nov.–Dec. 1987, pp. 3–14.
*IBM Writing Assistant.* IBM Personal Computer Software Manual, 1984, pp. 2–20.
J. Gettys et al, "Xlib-C Language Interface, X Window System, X Version II, Release 2", 1985–1988, Massachusetts Institute of Technology, 7 pages.
A. Nye, "Xlib Programming Manual for Version II of the X Window System", vol. 1, O'Reilly & Associates, Inc., 1988, 9 pages.
T. Clowes et al, "Moving and Scrolling Screen Windows", IBM Technical Disclosure Bulletin, vol. 29, No. 10, Mar. 1987, pp. 4361–4362.
B. A. Barker et al, "Method to Dynamically Adjust a Scrolling Unit", IBM Technical Disclosure Bulletin, vol. 28, No. 2, Jul. 1985, p. 856.
B. A. Barker et al, "Implicit Scrolling Via Cursor Type", IBM Technical Disclosure Bulletin, vol. 27, No. 12, May 1985, p. 6952.
A. Goldberg, "Smalltalk-80, The Interactive Programming Environment", Addison-Wesley Publishing Company, 1984, ISBN 0-201-11372-4, 61 pages.

*Primary Examiner*—Mark K. Zimmerman
*Attorney, Agent, or Firm*—Marilyn D. Smith; Wayne P. Bailey; Robert M. Carwell

[57] ABSTRACT

A tool for a display system comprises means for superimposing a box on a portion of a buffer of data visible on a display; the box being representative of the size and location of the visible portion with respect to the whole of the buffer. For example, a box of an appropriate size can be superimposed on a portion of a buffer of data displayed in a window at an appropriate location in the window to allow the two-dimensional extent of the visible portion of the buffer with respect to the rest of the buffer of data to be represented in an easily understood manner. The invention finds particular application as part of a scroll tool. By the provision of means for interacting with the scroll box the user is provided with a user-friendly manner of scrolling around a document in a plurality of directions. This scroll tool is much more convenient to use than conventional scroll bars and does not take up unnecessary screen real estate.

8 Claims, 11 Drawing Sheets

```
┌─────────────────────────────────────────────────────┐14
│     A SCROLLING TOOL FOR TEXT AND GRAPHICS          │
│              IN A DISPLAY SYSTEM                    │
│                                                     │
│     A PORTION OF THE DISCLOSURE OF THIS PATENT      │
│                        •                            │
│                        •                            │
│                        •                            │
│     FIGURE 2A CORRESPONDS GENERALLY TO FIGURE 1,    │
│     EXCEPT THAT A TWO DIMENSIONAL BOX 16 IS SUPERIMPOSED │
│     ON THE DATA 4 DISPLAYED IN THE WINDOW 12. THIS BOX 16 │
│                        •                            │
│                        •                            │
│                        •                            │
│     LOGIC 40 IS PROVIDED FOR RESPONDING TO MOUSE AND│
│     KEYBOARD INTERACTIONS IN A CONVENTIONAL MANNER FOR │
│     DETERMINING THE NEXT EVENT TO BE PROCESSED. DEPENDENT │
│                        •                            │
│                        •                            │
│                        •                            │
│     ALTHOUGH A PARTICULAR EMBODIMENT OF THE INVENTION│
│     HAS BEEN DESCRIBED IN THE CONTEXT OF A SCROLL TOOL, IT │
│     WILL BE APPRECIATED BY THOSE SKILLED IN THE ART, THAT │
│                        •                            │
│                        •                            │
│                        •                            │
│     INTERACTING WITH SAID SCROLL BOX TO SCROLL SAID │
│     BUFFER WITHIN SAID DISPLAY MEANS.               │
│                                                     │
│     30. A METHOD AS CLAIMED IN CLAIM 29 WHEREIN SAID│
│                        •                            │
│                        •                            │
│     48. THE METHOD OF CLAIM 47 WHEREIN THE STEP OF  │
│     REPOSITIONING COMPRISES RECEIVING A USER INTERAC-│
│     TION WITHIN SAID REPRESENTATION FOR SCROLLING THE│
│     DATA IN A FIRST AMOUNT, AND MEANS FOR RECEIVING A│
│                        •                            │
│                        •                            │
│                        •                            │
│        ┌─────────┐         ┌─────────────┐          │
│        │ DISPLAY ├─────────┤  OTHER I/O  │          │
│        └─────────┘         └─────────────┘          │
│           9                                         │
└─────────────────────────────────────────────────────┘
```

SCROLLING TOOL FOR TEXT AND GRAPHICS IN A DISPLAY SYSTEM

This is a continuation of application Ser. No. 07/674,423 filed Mar. 22, 1991, which is a continuation of application Ser. No. 07/204,669, filed Jun. 10, 1988, both now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to a tool for a display system, and more particularly to a system and method for scrolling information displayed to a user of a data processing system.

DESCRIPTION OF THE RELATED ART

Features of a display system such as windows, mouse interactions, and scrolling tools have been part of computer user interfaces since the early 1970s. A scrolling tool known in the art is represented as a narrow rectangle, termed a scroll bar, along an edge of a window.

The scroll bar usually contains a darkened rectangle sometimes referred to as the thumb. The size of the thumb represents the amount of data being displayed in the window relative to the whole buffer of data. The position of the thumb within the scroll bar indicates the relative position of the data in the window to the beginning of the buffer. The user may select the thumb with the mouse and move it up or down inside the scroll bar. This action causes the data to scroll in the window in the indicated direction.

Data may be scrolled as the thumb is moved, referred to as dynamic scrolling. Due to the performance of the display system, a more common form of scrolling is static scrolling in which data is scrolled after the release of the mouse button, or movement of the thumb.

The user may also click the mouse (i.e., depress and then release a mouse button) in the scroll bar. This interaction causes the data to scroll one full window in the direction indicated by the position of the mouse cursor in the scroll bar.

Other personal computer systems may feature two scroll bars for each window containing data to be displayed: one for scrolling horizontally, and one for scrolling vertically. These scroll bars differ from the previously described scroll bar in that 1) the thumb indicates the relative position only, not the relative size of the displayed data portion, and 2) each scroll bar has two other button indicators which allow scrolling in different increments other than one full window. Usually, this increment is one line at a time, in the vertical direction, and a predetermined increment, such as a half window, in the horizontal direction. The scroll bars for horizontal and vertical scrolling are positioned perpendicularly along a side and bottom window edges. Scrolling horizontally and vertically are done independently. Therefor, scrolling diagonally can only be accomplished by multiple mouse interactions with the two scroll bars.

Since the introduction of these two scrolling systems, numerous types of scroll bars have been introduced; many with slightly differing semantics. For example, some scroll bars take different actions if the user clicks above or below the thumb while others have no thumb at all. Some systems do not allow horizontal scrolling. Other systems allow diagonal scrolling via the interaction with horizontal and vertical scroll bars.

Some essential characteristics of these scrolling tools include the following: 1) scrolling is accomplished via mouse interactions in the scroll bar, usually by manipulating the thumb; 2) the scroll bar thumb may indicate the size and position of the data being displayed relative to the whole buffer; 3) horizontal scrolling, if done at all, is done by manipulating a separate horizontal scroll bar; 4) diagonal scrolling is accomplished via multiple interactions with the mouse and the horizontal and vertical scroll bars; 5) the scroll bars can scroll data in at most two increments with one click of a mouse button; and 6) the scroll bars are placed along the edges of the window, and thus take up extra space on the display portion of the screen.

These characteristics of scrolling tools known in the art contain a series of flaws which inhibit smooth interaction and effectiveness for the user. For example, where scrolling in two dimensions is required, multiple tools are provided for separately scrolling vertically and horizontally. These tools not only require additional interaction from the user to scroll in a variety of directions, but take up additional screen real estate.

SUMMARY OF INVENTION

An object of this invention is to present to the user a visual representation of the size and position of information displayed to a user relative to the total size of the information stored in a buffer, without using additional display screen real estate.

A further object of the invention is to enable horizontal, vertical, and diagonal scrolling in a variety of increments in a smooth and effective manner with a minimum amount of user interaction.

The display system of this invention comprises a display for use with a processing system, means for displaying information either on the total screen display, or on a portion of the screen such as in a window of the screen display, and a scrolling tool.

The scrolling tool for a display system of this invention presents a unique combination of operations allowing the user to either scroll vertically, horizontally, or diagonally, in multiple increments with an economy of interaction, while giving a visual representation of the data size and position being displayed relative to the size of the buffer of data. These features are uniquely packaged in a single tool that saves screen real estate by appearing within the target window XORed onto the displayed data. In this way, no data in the target window is obscured.

The size of the scroll box in relation to the size of the information displayed to a user is proportional to the size of the information displayed to a user in relation to the total size of the information stored in the buffer. In addition, the location of the scroll box superimposed on the information displayed to a user is representative of the relative position that the displayed information has to the beginning of the buffer storing the information. Therefore, the size and position of the scroll box superimposed on the displayed information is representative of the size and position of the displayed information visible to a user with respect to the information as a whole.

If a window is used to display the data, the size and location of the scroll box within the window would be proportional to the size and position that the window of information is relative to the whole buffer of information. If the total display screen is used to display the data, the size and location of the scroll box within the display screen would be proportional to the size and location that the information displayed has to the whole buffer of information.

In either case, by superimposing the scroll box within the displayed information, the size and position of the visible portion of buffered data with respect to the whole buffer can be graphically illustrated without using additional screen space for scroll bars. This aspect of the scroll box allows a two-dimensional representation of the visible portion of the buffer to be represented in a much more readily appreciated manner than is possible with separate horizontal and vertical scroll bars.

In order to determine the size of the box to be displayed, the scrolling tool comprises sizing means for determining the relative sizes of the displayed information and the entire buffer of information, and means for generating a representation of a two dimensional area of a particular size in dependence on said determination.

In order to enable easy user interaction with the superimposed scroll box, the sizing means will generate a two dimensional area having dimensions of at least a predetermined size. In a special case when the visible displayed portion of a buffer is very small with respect to the buffer of data as a whole, the size of the scroll box with respect to the size of the displayed information (i.e., either the size of a window, or the size of the screen display as a whole), will not be proportional to the ratio of the size of the visible portion to that of the whole buffer. Instead, in this special case, the size of this scroll box will have this predetermined minimal size.

In order to determine the position of the scroll box within the window of displayed information, the positioning means positions the top of the scroll box from the top of the window of displayed information in the same ratio as the first item displayed is relatively positioned with respect to the buffer of information as a whole.

For superimposing the box on the displayed portion of the buffer of data, the means for superimposing the box preferably comprises means for logically combining the representation of a two dimensional area, i.e., the boundaries of the box, with the displayed portion of the buffer of data at a location in the displayed portion representative of the location of the displayed portion with respect to the buffer as a whole. In a particular embodiment to be described later, the logical combination function used is an exclusive-OR function. This is a way of superimposing the box on the data from the buffer without obscuring that data.

A box as described above can be used for scrolling a buffer of data by interacting with the box to scroll a buffer of data within a displayed area on a screen.

The means for interacting with the box comprises 1) a user-operable cursor positioning means for causing movement of a cursor, such as a mouse input device or cursor positioning keys on a keyboard, 2) a user-operable dynamic scroll selector, such as one or more buttons on a mouse or input keys on a keyboard, and 3) scroll logic.

The scroll logic responds to an operation of the cursor positioning means indicating movement of the cursor in a selected direction when the dynamic scroll selector has been activated to cause scrolling of the data buffer with respect to a window displaying the information. The data buffer is scrolled in a direction opposite to that indicated by the operation of the cursor positioning means. The amount of scrolling is proportional to the amount of cursor movement. The scroll box is dynamically repositioned with respect to the amount of the cursor movement. The resulting position of the box within the window indicates the new relative position of the data being displayed relative to the whole buffer.

Another means for interacting with the box comprises 1) user-operable cursor positioning means for causing movement of a cursor, 2) a user-operable preset scroll selector, which may include but is not limited to a different use of a button on the mouse or different keys on the keyboard, and 3) scroll logic for preset scrolling. The scroll logic causes scrolling of the data buffer by a preset amount in a selectable direction in response to the position of the cursor with respect to the box, and in response to the operation of the preset scroll selector, e.g. clicking a mouse a button.

Preferably, scrolling in a selected direction, in response to the operation of the preset scroll selector, is by a first or a second preset amount dependent upon whether the cursor is inside or outside the box on operation of the preset scroll selector.

Preferably, as an aid to the user, the scroll box tool is logically divided into several regions. The direction in which scrolling will occur, upon operation of the preset scroll selector, will depend upon which logical region the cursor is positioned within.

Preferably, the means for dynamically superimposing a box alters the position of the box within the displayed portion of the data buffer in accordance with the scrolling of the data buffer whereby the box dynamically indicates the portion of the data currently visible in relation to the buffer as a whole.

Accordingly, the method of this invention comprises displaying a portion of a buffer of data on a screen display, superimposing a two dimensional object such as an outline of a box on the portion of the buffered data visible on the display, and sizing and locating the box within the displayed portion of the buffered data in relation to the size and location of the displayed portion with respect to the buffer as a whole.

The method of scrolling the buffer of data within the displayable screen or a portion thereof further comprises interacting with the superimposed box to scroll the buffer within the displayable screen, and dynamically relocating the box within the displayable data to illustrate to the user the current relationship between the displayed scrolled buffer of data and the buffer as a whole.

BRIEF DESCRIPTION OF THE DRAWINGS

A particular embodiment of the invention is described in the following with reference to the accompanying drawings in which:

FIG. 1B is an example of the contents of a buffer of data, both text and graphics, used to illustrate the invention herein;

DESCRIPTION OF THE PREFERRED EMBODIMENT

Figure 1A:
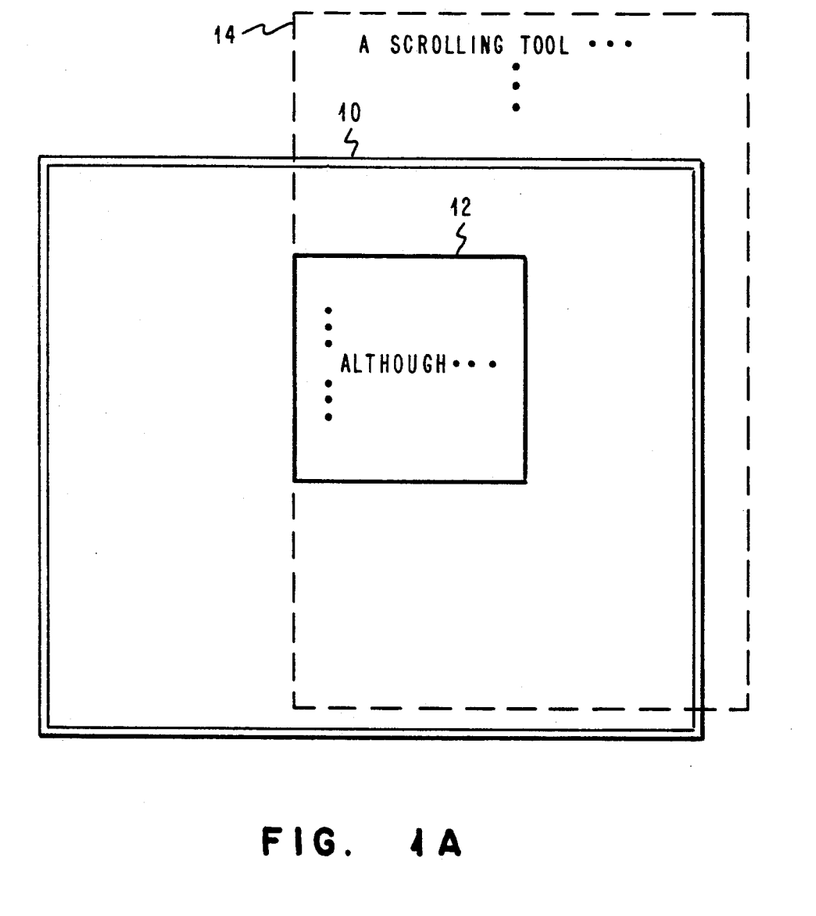
FIG. 1A is a schematic illustration of a display showing a window.

By way of introduction to the present invention, FIG. 1A represents a typical screen 10 of data in a display system which supports a window 12. Within the window 12, data relating to an associated task is displayed. Typically, the data for display in a window comprises data which is stored in a buffer 14 for the associated task. For example, the contents of this patent application, including the drawings, could be stored in a buffer 14, FIG. 1B, as text and graphics. More often than not, the size of the buffer is larger than the amount of data that can be displayed within a window 12. The window 12 may be the same size as the display field of the display screen 10, but typically will cover only a part of the screen as the case, for example, with the window 12 in FIG. 1A.

Therefore, a scrolling tool is provided that allows the user to browse the buffer within the constraints imposed by the size of the target window 12. As the user graphically manipulates the scroll box via the mouse, the contents of the window 12 change, reacting to the manipulation, to display a different portion of the buffer 14.

The operation of a tool in accordance with the invention will now be described with reference to FIGS. 1C, 2A to 2D, and FIGS. 3 and 4A to 4C in terms of a scroll tool for a display system for the display of data in a display system which supports windows. It should however be noted that the invention is not limited in its application to display systems which support windows.

Figure 1C:
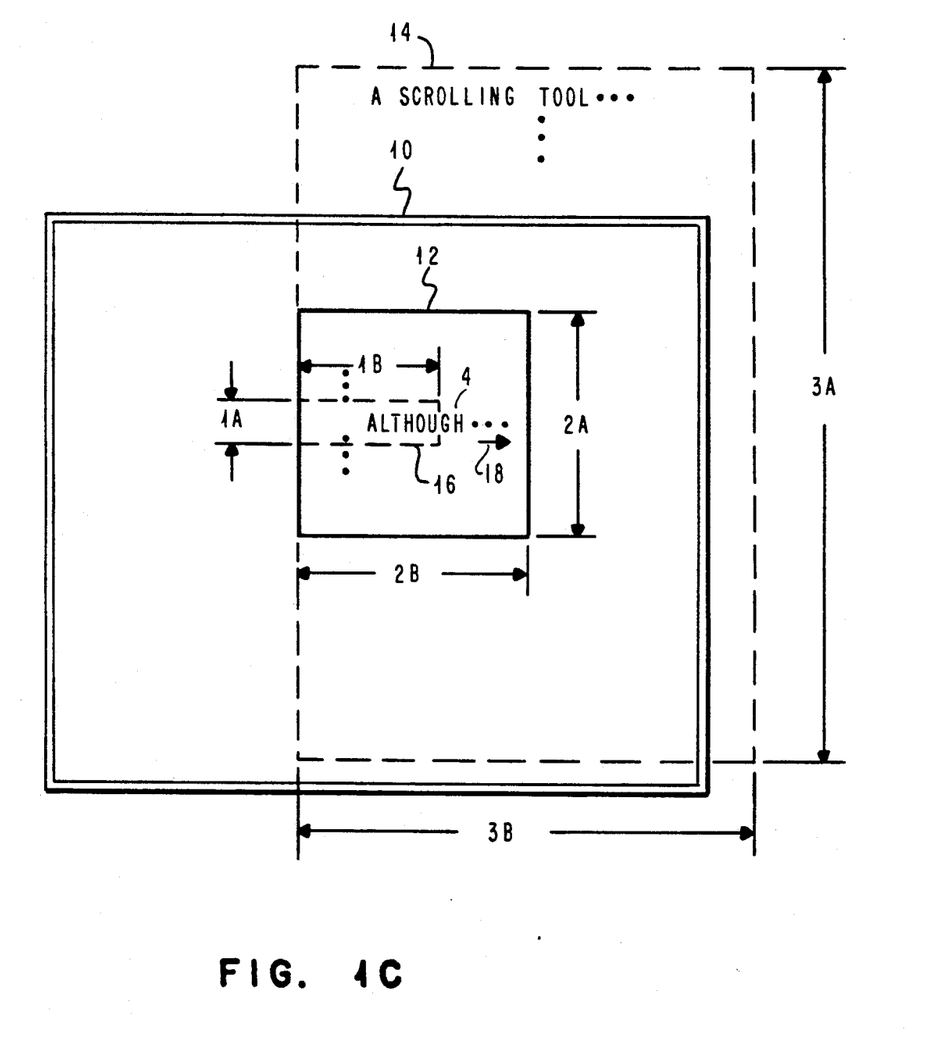
FIG. 1C illustrates the size and position of a tool to represent the relative size and position of displayed data to the buffer of data as a whole.

FIG. 1C corresponds generally to FIG. 1A, except that a two dimensional box 16 is superimposed on the data 4 displayed in the window 12. This box 16 is representative of the size and location of the displayed portion 4 of the buffer of data 14 to the whole buffer 14. The box tool 16 is invoked whenever the user interacts with the mouse and the cursor 18 is within the window 12, or the cursor is moved into the window. The control of the cursor movement is preferably made using a mouse in a conventional manner (although other form of cursor control such as keyboard buttons or a joy stick can be used). The tool 16 can also be invoked by other means known in the art for selecting actions.

Figure 3:
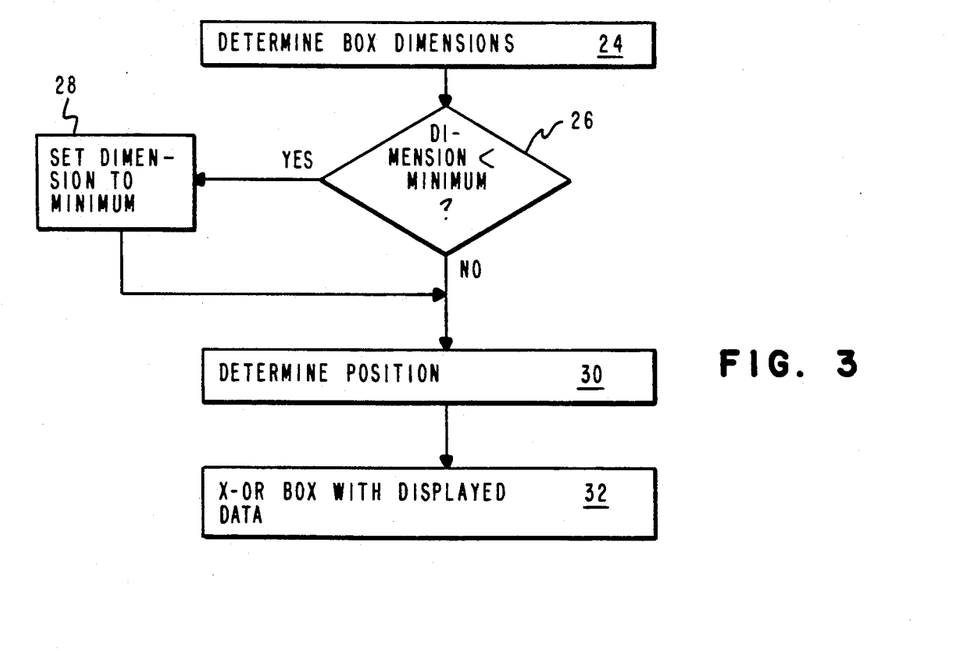
FIG. 3 is a schematic block diagram of part of the logic for a tool in accordance with the invention.

Upon invoking the box, box generation logic as illustrated in FIG. 3 determines the size of the box to be displayed, step 24, FIG. 3. This can be done in the most simple manner by first determining the number of rows 3A for the buffer 14, FIG. 1C, and the maximum number of characters in a row 3B of a data buffer 14, and also determining the height 2A and width 2B of the displayed portion of the buffered data 4. These determinations can be made in any appropriate manner by accessing system variables and/or computing the values from the primary data. From these values the ratios of the horizontal 2B and the vertical 2A dimensions of the visible portion of the buffered data 4 to the corresponding dimensions 3B, 3A of the buffer 14 can be established. The horizontal 1B and vertical 1A dimensions of a box 16 to represent the size of the displayed data portion 4 relative to the buffer of data as a whole 14 can then be determined by using these ratios with respect to the dimensions of the window 12 and the buffer as a whole 14. In other words, the ratio of the horizontal dimension 1B of the box 16 to the horizontal dimension of the window 2B would equal the ratio of the horizontal dimension 2B of the window 12 to the horizontal dimension 3B of the buffer 14 as a whole. As shown in FIG. 1C, the ratio of 1B:2B would equal the ratio of 2B:3B. Likewise the vertical dimension 1A of the box 16 is determined from the size of the vertical dimension 2A of the displayed portion of data 4 and the vertical dimension 3A of the buffer 14 as a whole.

In order to facilitate interaction with the box 16, it is desirable for it to have dimensions of at least a predetermined minimum value. For this reason, if the dimensions of the box 16 are too small, step 26, FIG. 3, the dimension concerned is set to this minimum value, step 28, FIG. 3. Although the size of the box is still representative of the size of the displayed portion, it is not exactly proportional thereto. As well as the size of the box, the box generating logic determines the position within the window 12 at which the box 16 should be displayed in order to represent the portion from the buffer which is visible, step 30, FIG. 3.

Once these values have been determined, a representation of an area 16 of the appropriate size is logically combined with the data 4 at the appropriate location within the window, step 32, FIG. 3. As shown in FIG. 3, the logical combination is achieved with an exclusive OR function. In this way, the window's data is still readable even though the box has been superimposed thereon. Other logical combinations could, however, be performed as appropriate.

By positioning the box 16 relative to the containing window 12 in this way, the user can be given a visual representation of the portion of data 4 being displayed within the window 12 relative to the buffer 14. By sizing the box 16 relative to the window 12, the user can also be given a visual representation of how much of the buffer 14 is being displayed within the window 12 relative to the size of the whole buffer 14.

Figure 2A:
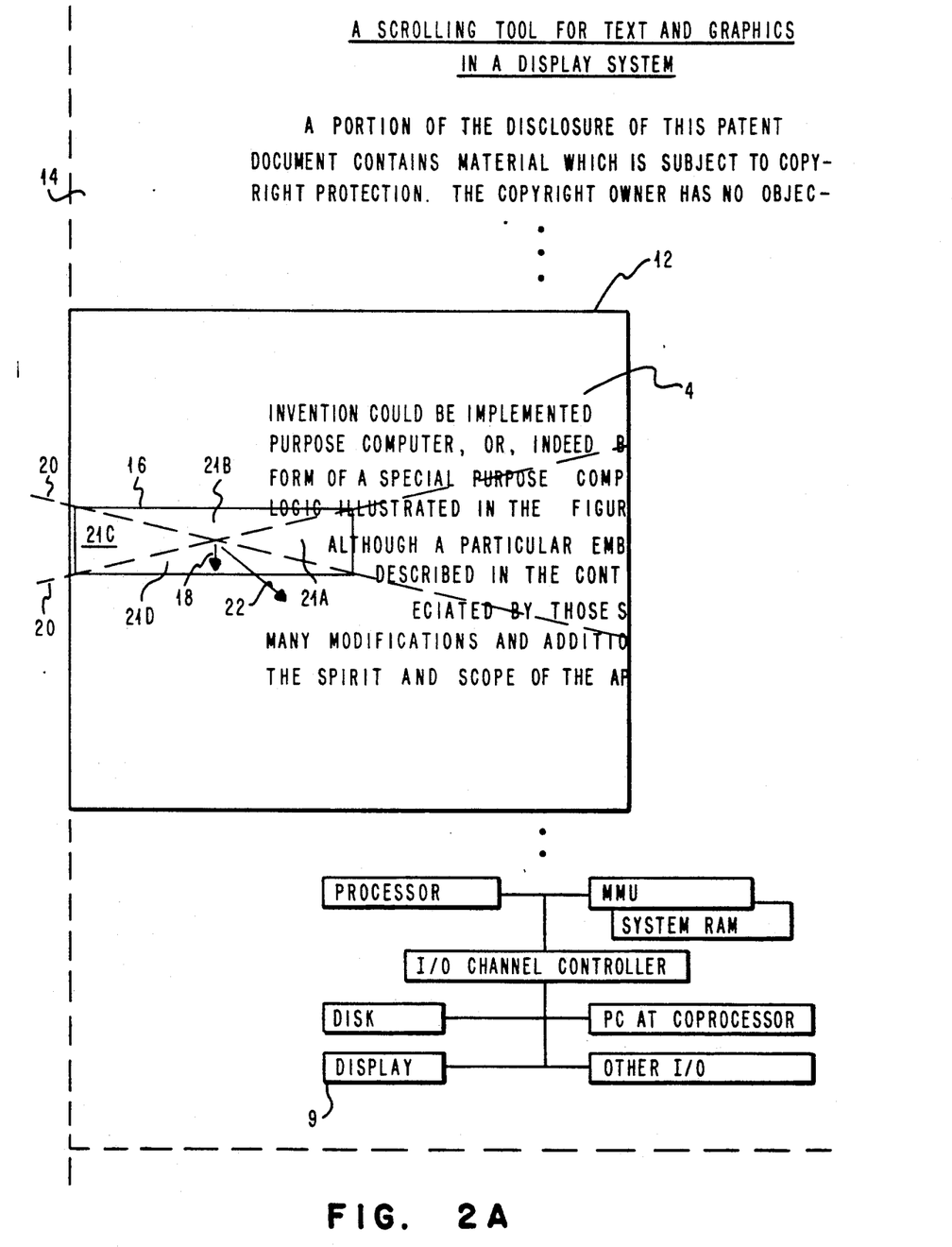
FIGS. 2A to 2D illustrate the scrolling of a buffer of data within the window by a tool in accordance with the invention.
Figure 2B:
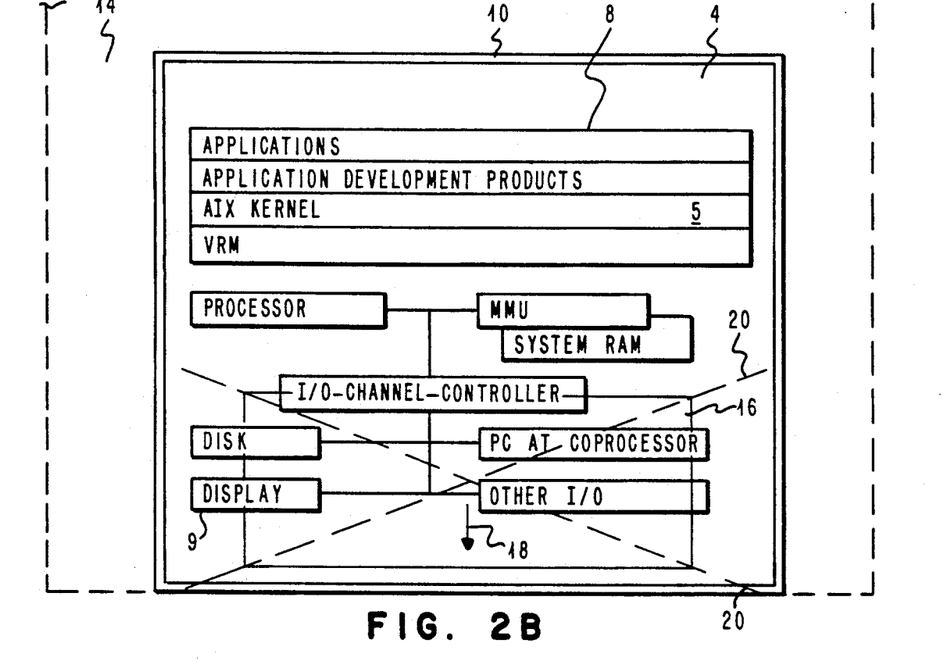
Figure 2C:
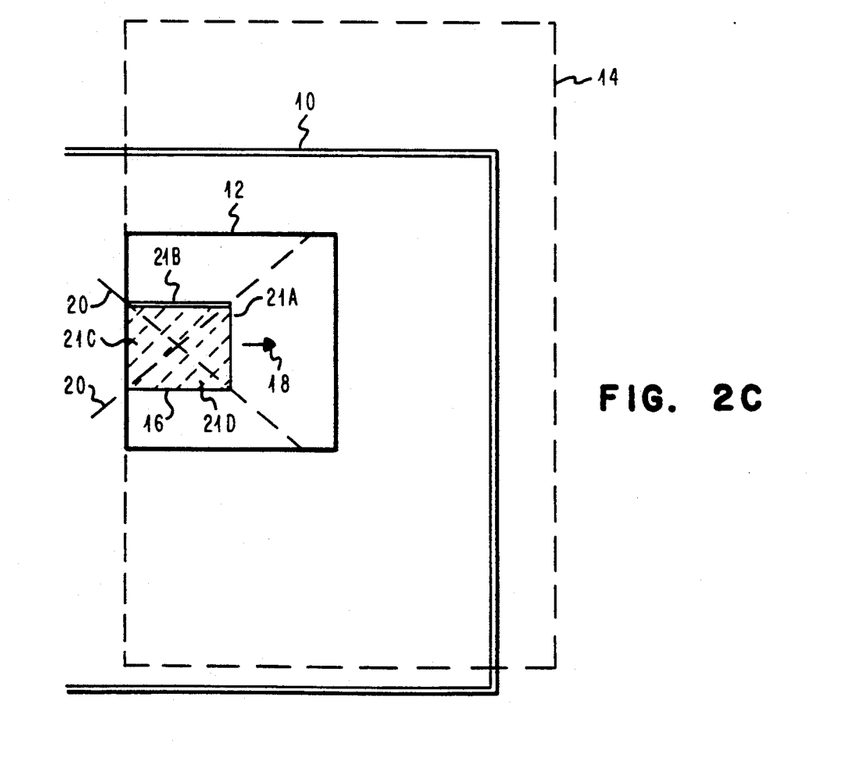
Figure 2D:
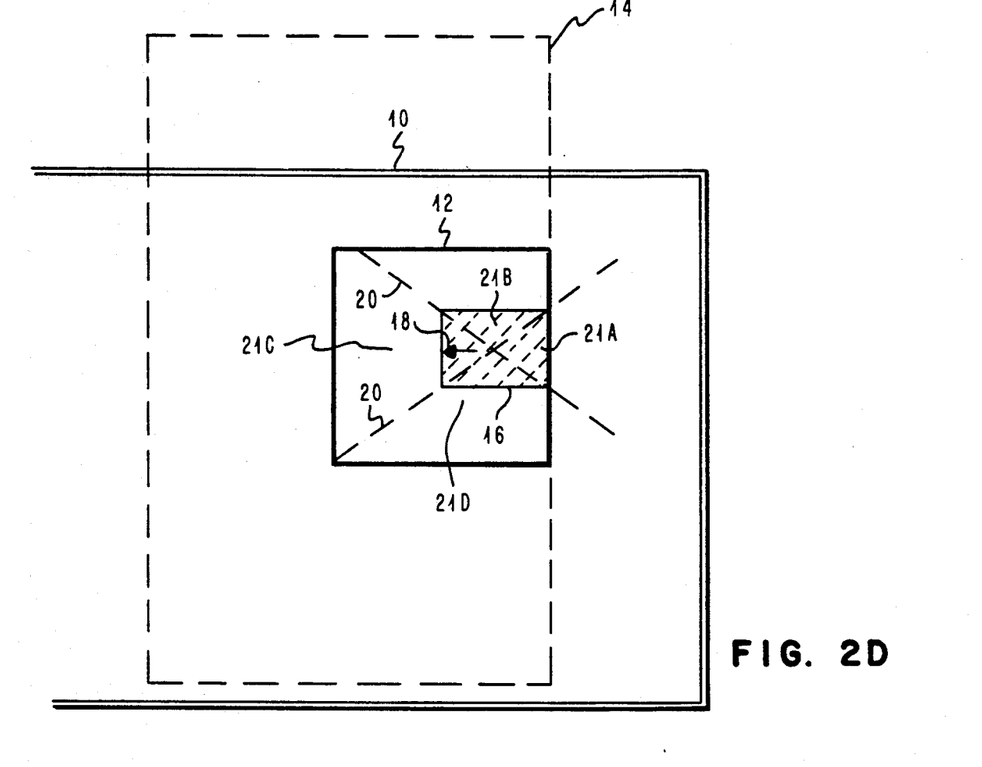

In FIG. 2A, and also in FIGS. 2B to 2D, diagonal lines 20 are shown. These are not actually displayed on the screen, but are shown in the drawing to illustrate the division of space around the center of the box 16 into a number of regions, 21A to 21D, FIG. 2A. It should be understood, however, that a number of regions other than four may be chosen if desired. Also, the mouse cursor is caused to change shape as it moves within the window in order to indicate the direction of scrolling that will occur if the designated button is clicked. It can be seen in FIGS. 2A and 2B that the cursor arrow 18 points down, in FIG. 2C it points to the right and in FIG. 2D it points to the left. Logic is provided for determining in which of these regions the cursor 18 is to be found and for displaying a cursor symbol having a form which is dependent upon the region 21A to 21D in which it is to be found. The cursor symbol for each region is preferably an arrow or the like which indicates a direction. This is used for indicating a direction of scrolling during a preset scrolling operation as will be explained later.

FIGS. 2A to 2D and 4A to 4C illustrate how the box 16 can be used as part of a scroll tool for scrolling a buffer of data 14 with respect to a window 12 in an efficient and user friendly manner. Two basic types of scrolling operations are described using a mouse. The first type of scrolling utilizes a "point and drag" technique to activate the dynamic scroll selector in which a designated button is held down and the mouse is moved to move the cursor. This is illustrated in FIGS. 2A and 2B and comprises pressing a designated mouse button, moving the mouse in a desired direction and then releasing the button.

The second type is "clicking" referred to as "preset scrolling". Preset scrolling is illustrated in FIGS. 2C and 2D and comprises the steps of simply depressing and releasing the designated mouse button without moving the mouse. The direction of scrolling in this case is determined by the position of the cursor 18 with respect to the regions 21A to 21D mentioned above, and is indicated by the direction of the arrow-like cursor at the time of clicking the designated button. The amount of scrolling in this case is determined by whether the cursor is inside or outside the box 16 at the time of clicking.

Figure 4A:
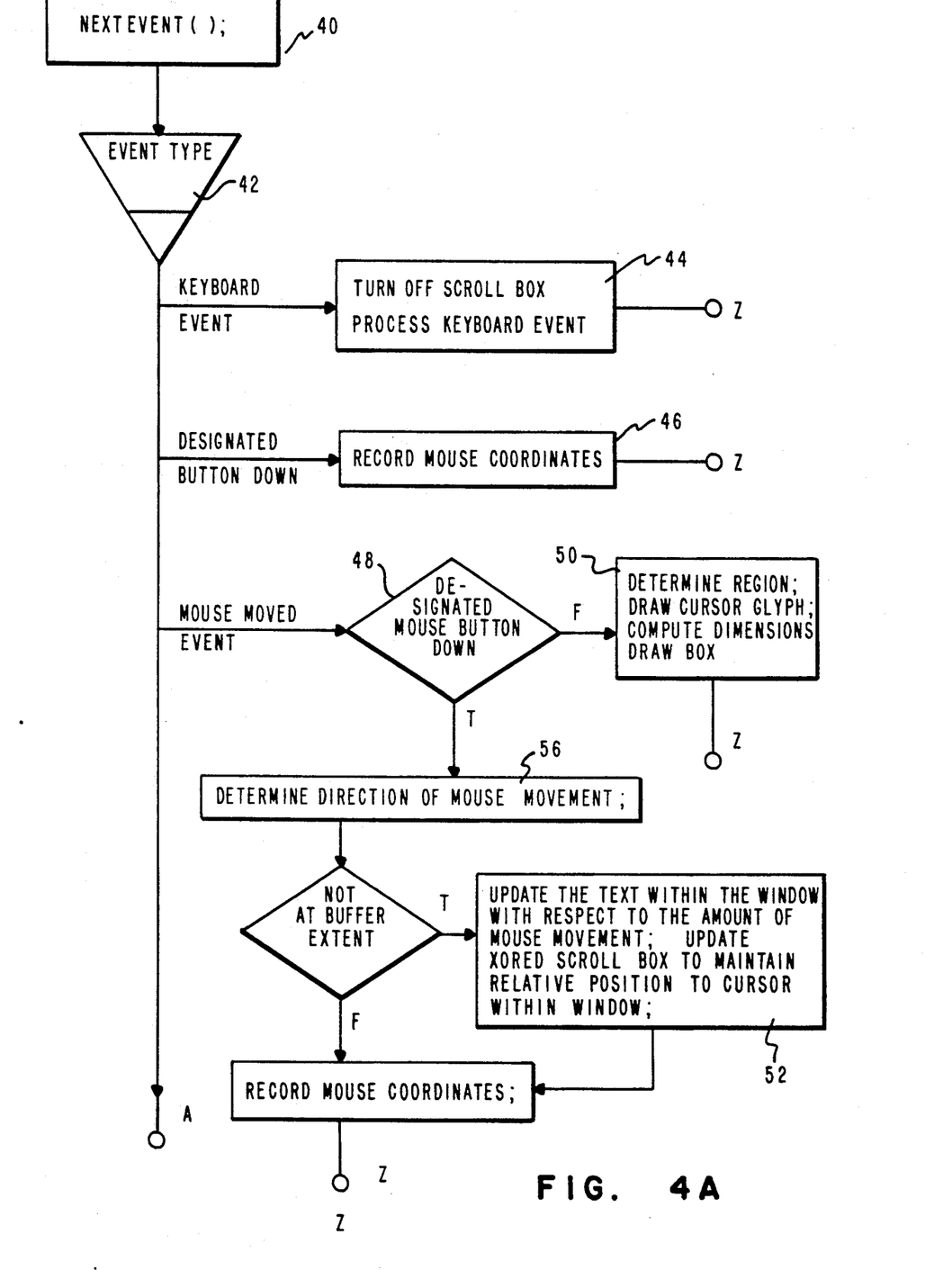
FIGS. 4A to 4C form a schematic block diagram of further parts of the logic of the tool.
Figure 4B:
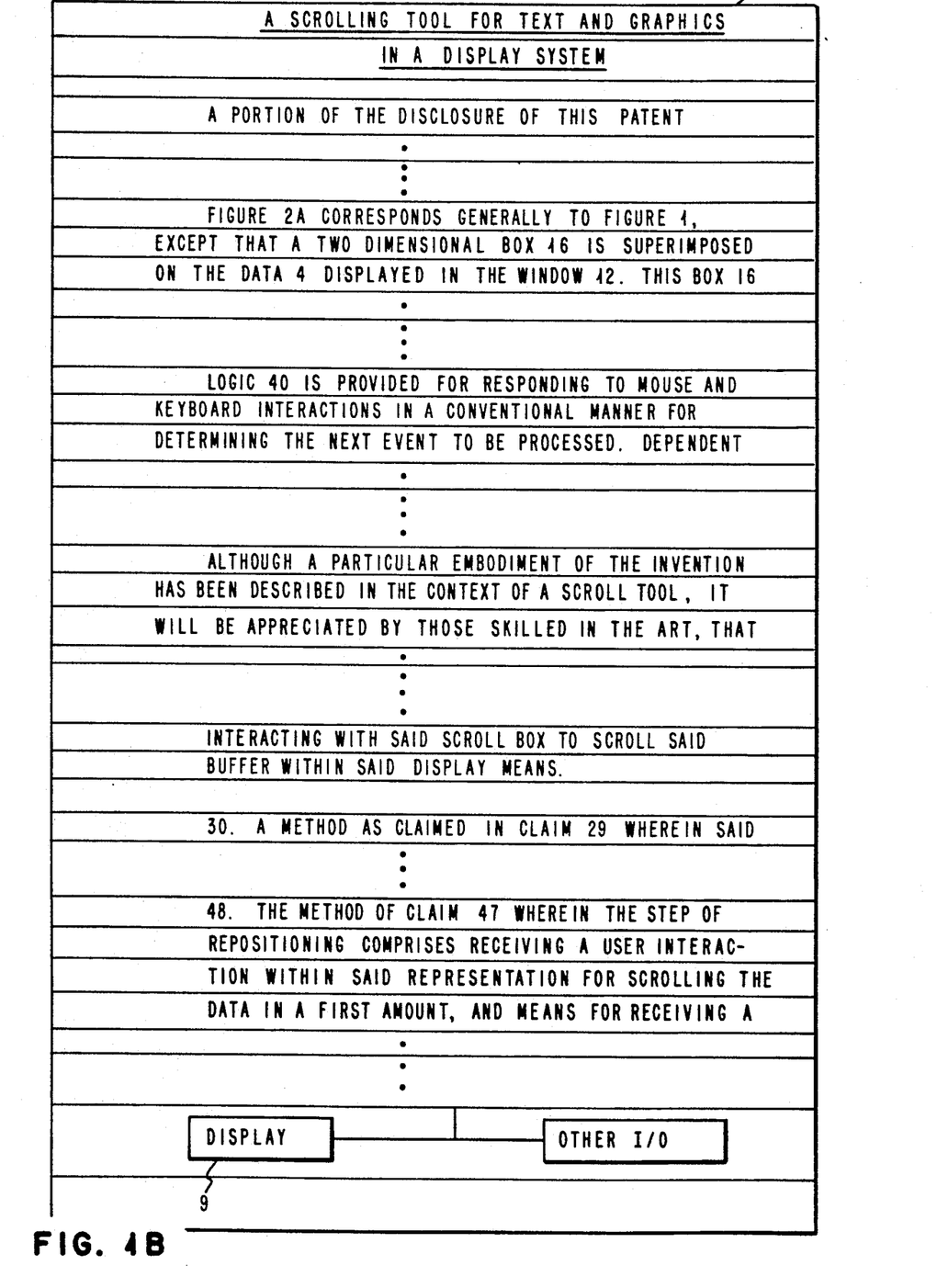
Figure 4C:
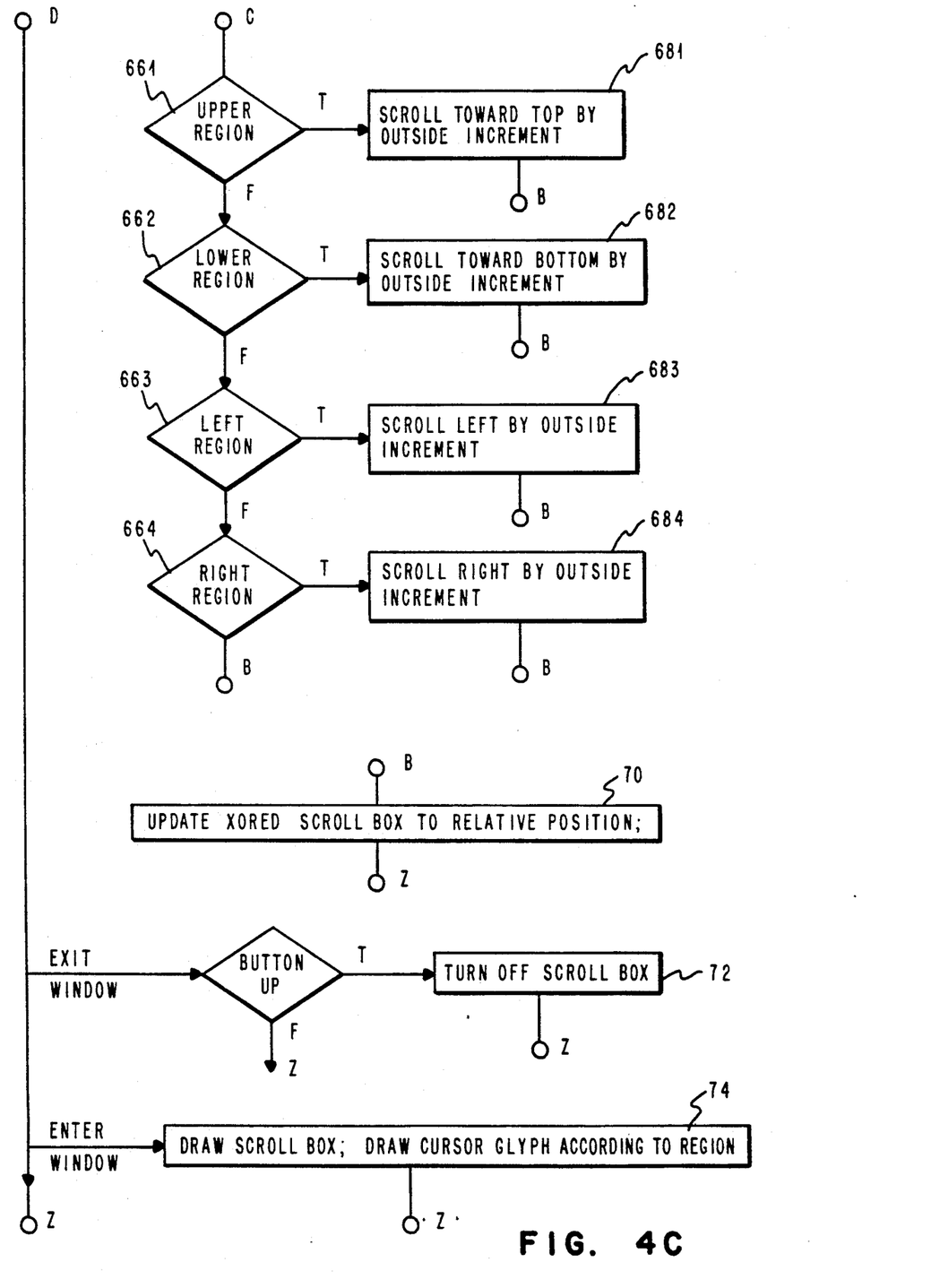

FIGS. 4A to 4C represent the control logic for controlling the scrolling operations when the box 16 is displayed in the window 12. In the context of this example of the use of the box 16, the box is termed a scroll box.

Logic 40 is provided for responding to mouse and keyboard interactions in a conventional manner for determining the next event to be processed. Dependent upon the event type when an event happens, a number of actions will occur as set out in FIGS. 4A to 4C.

If there is a keyboard event, the scroll box is turned off and the keyboard event is processed in step 44.

If the designated button is down, the mouse coordinates are stored in step 46.

If the event is the moving of the mouse, a test is made in step 48 to determined whether the designated button is down. If the designated button is not down, then the new position of the cursor 18 is determined with respect to the aforementioned regions and the appropriate cursor symbol is drawn in step 50. The dimensions of the box 16 are computed, and the box is superimposed on the displayed data 4, also step 50.

If the designated mouse button is down, this means that the logic recognizes, at step 56, that point and drag scrolling is in progress. In FIG. 2A the direction of mouse movement for a dynamic scrolling operation is represented by the arrow 22 which is intended to illustrate the direction of cursor movement which would have occurred if the designated button had been pressed. The effect of pressing the designated mouse button and moving the mouse is to dynamically move the scroll box 16 with the cursor in the indicated direction, and to scroll the data, either dynamically or statically, past the window in the opposite direction.

FIG. 2B illustrates the state of the display 10 following a dynamic scroll operation from FIG. 2A. It can be seen that the position of the scroll box 16 on the display means 10 has moved to reflect the relative change in position between the portion 4 of the buffer of data which is visible, to the buffer 14 as a whole.

The amount of scrolling is determined by the distance of the mouse movement. In other words, the greater the amount of mouse movement, the greater the amount of scrolling. For example, pressing the designated mouse button within the scroll box, and moving the mouse towards the bottom of the window will scroll the data within the window towards the end of the data buffer. By extending the mouse movement, the user extends the amount of data scrolled, from line by line all the way to a repositioning at the end of the buffer of data. For each incremental mouse movement, the scroll box 16 is repositioned within the target window 12 indicating the new relative position in the data buffer 14, step 52. As is illustrated in FIGS. 2A and 2B, scrolling can be achieved in a diagonal as well as horizontal and vertical directions. The limit on the direction of scrolling possible is basically determined by the angular resolution of mouse movement.

If the designated button is released then a test is made at step 54, FIG. 4B, to see whether the mouse position coordinates have changed while the button was down, or pressed. If the mouse position has not changed, the logic knows that a preset scrolling operation is required. The logic at step 58 determines the region in which the cursor is to be found in order to determine the preset scrolling operation to be performed. The actual tests performed are expanded as shown in FIG. 4B and 4C.

If the cursor is within the box 16 (step 60), then this means that a scrolling operation by a first increment is needed. Dependent upon one of the four regions 21A to 21D inside the box in which the cursor 18 is to be found (steps 621, 622, 623, 624), scrolling takes place by a first increment in an appropriate direction (steps 641, 642, 643, 644).

If the cursor is outside the box 16, then this means that a scrolling operation by a second increment is needed. Dependent upon one of the four regions 21A to 21D outside the box 16 in which the cursor 18 is to be found (steps 661, 662, 663, 664), scrolling takes place by a second increment in an appropriate direction (steps 681, 682, 683, 684).

For example, clicking the mouse inside the scroll box 16 can be arranged to cause the data to scroll one line vertically or one character horizontally as appropriate. Clicking the mouse outside the scroll box 16 can be arranged to cause the data to scroll a different increment, one window full either horizontally or vertically, for example. The direction of the scroll is determined by the position of the mouse cursor when the click occurred. Thus, for example, if the user clicks inside the scroll box 16 in the upper region 21B, the data will scroll one line toward the beginning of the data buffer 14. If the user clicks outside the scroll box 16 in the lower region 21D, the data will scroll one page toward the end of the data buffer 14. If the user clicks outside the scroll box 16 in the right region 21A, as illustrated in FIG. 2C, the data will scroll one full window to the right as illustrated in FIG. 2D. At the end of a preset scrolling operation the scroll box position is updated at step 70.

If the cursor exits the window with no buttons depressed, the scroll box is turned off at step 72. Other ways of turning off the scroll box may include a keyboard input, another button other than the designated mouse button, and other ways known in the art to deselect an action.

If the cursor enters the window, the scroll box is superimposed on the displayed data, and the cursor glyph is oriented according to the region in which it is located, step 74.

In the following, programming design language code is presented as an alternative representation of the logic shown in FIGS. 4A to 4C. This code illustrates the actions to be taken when certain events occur. Many events that might occur are not relevant to processing the scroll box and are ignored. Events are obtained by some external procedure, NextEvent, which returns an event record containing the event type, the button dispositions, and the mouse coordinates.

---
Copyright IBM Corporation 1988
---

```
NextEvent( );
switch( event type ){
case keyboard event:
  turn off scroll box
  process keyboard event;
case designated button down:
  record mouse coordinates;
case mouse moved:
  if ( designated mouse button down ) {
    determine direction of mouse movement
    if ( not at buffer extent in designated
      direction) {
      update the data within the window with
        respect to the amount of mouse
        movement
      update XORed scroll box to maintain
        relative position to cursor within
        target window
    }
    record mouse coordinates;
  }
  else {
    If ( box not visible) {
      compute dimensions
      draw box
    }
    determine region;
    draw cursor symbol according to cursor region;
  }
case designated button up:
  if ( current coordinates same as recorded
    coordinates ) {
    determine region;
    if ( inside scroll box ) {
      if ( upper region )
        scroll toward top of data buffer
          by inside increment;
      else if ( lower region )
        scroll toward bottom of data buffer
          by inside increment;
      else if ( left region )
        scroll left by inside increment;
      else if ( right region )
        scroll right by inside increment;
    }
    else {
      if ( upper region )
        scroll toward top of data buffer
          by outside increment;
      else if ( lower region )
        scroll toward bottom of data buffer
          by outside increment;
      else if ( left region )
        scroll left by outside increment;
      else if ( right region )
        scroll right by outside increment;
    }
  }
  update XORed scroll box to maintain relative
    position to cursor within target window
case exit window:
  if (designated mouse button up)
    turn off scroll box;
case enter window:
  draw scroll box;
  draw cursor symbol according to region;
}
```

Figure 5A:
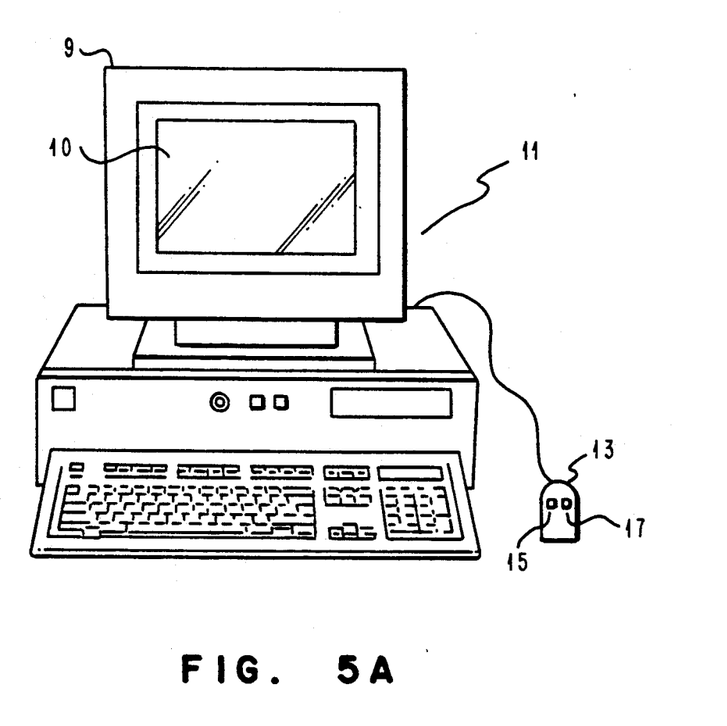
FIG. 5A illustrates the hardware including a display of a processing system for utilizing this invention.
Figure 5B:
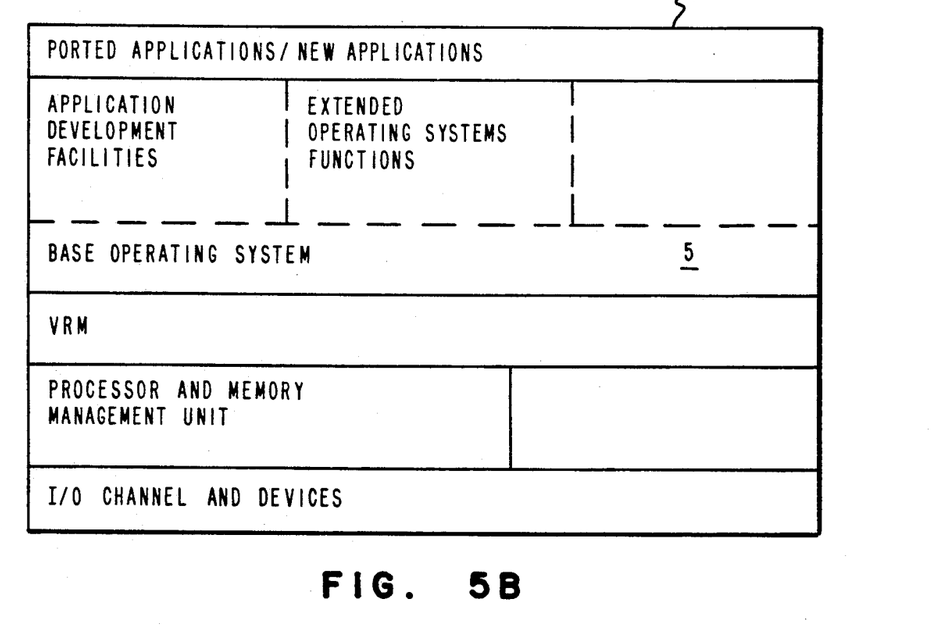
FIG. 5B illustrates the logical structure of the processing system of the preferred embodiment.
Figure 5C:
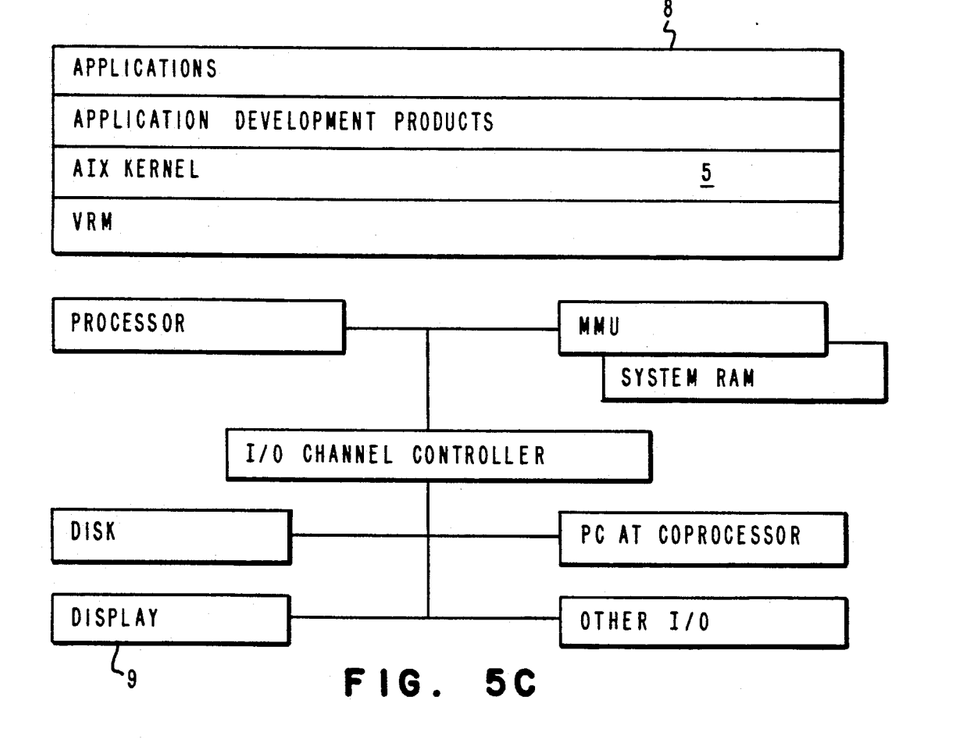
FIG. 5C illustrates the physical structure of the processing system of the preferred embodiment.

The preferred embodiment of the invention is implemented by suitably programming an IBM RT PC computer system 11, FIGS. 5A, 5B, 5C running the AIX operating system 5. The display means referred to could be a window on the screen of the display 9 of the computer system 11 shown in FIG. 5A. The designated button referred to in the above description could be either one of the buttons 15, 17 on the mouse 13, also shown in FIG. 5A. FIG. 5B shows the logical structure 7 of the computer system 11. FIG. 5C is a schematic representation of the physical structure of the computer system 11.

For more information on the RT PC, and the AIX operating system, the following references are herein incorporated by reference. Bach, M. J., *The Design of the UNIX Operating System,* Prentice Hall, 1986. Lang, T. G. and Mothersole, T. L., *Design of the RTPC VRM Nucleus,* Sep. 1, 1986. *AIX Operating System Commands Reference,* IBM Corporation, SC23-0790. *AIX Operating System Managing the AIX Operating System,* IBM Corporation, SC23-0793. *AIX Operating System Programming Tools and Interfaces,* IBM Corporation, SC23-0789. *AIX Operating System Technical Reference,* Volumes 1 and 2, IBM Corporation, SC23-0808 and SC23-0809. *IBM RT Personal Computer Technology,* IBM Corporation, SA23-1057, 1986. *Virtual Resource Manager Technical Reference,* Volumes 1 and 2, IBM Corporation, SC23-0816 and SC23-0817.

The use of a scroll box as described above presents a unique combination of operations allowing the user to either scroll vertically or horizontally in multiple increments with an economy of interaction, while giving visual feedback as to the amount of data being displayed relative to the size of the data buffer. These features are uniquely packaged in a single tool that saves screen real estate by appearing within the target window XORed onto the displayed data.

The preferred embodiment has been described above. However, other embodiments may be utilized. For example, the box may simply be used for representing the part of a buffer of data that is visible in a display window and may not be used for scrolling.

Also, although the display means in which the buffer of data is displayed will typically be rectangular, this need not be the case. For example, a window may be circular.

In addition, the buffer of data need not be a text document, but could be in the form of graphical or video data. The data could, for example, represent a map. The document could also be in the form of a mixed media document, in for example, a desk-top publishing application where the document forms a page of a newspaper.

In the preferred embodiment, the logic illustrated in the diagrams is implemented by suitably coding the personal computer system illustrated in FIGS. 5A to 5C. However, it will be appreciated that the invention could be implemented on another general purpose computer, or, indeed be implemented in the form of a special purpose computer by hard wiring the logic illustrated in the Figures.

Although a particular embodiment of the invention has been described in the context of a scroll tool, it will be appreciated by those skilled in the art, that many modifications and additions are possible within the spirit and scope of the appended claims.

We claim:

1. A tool for displaying data, said tool comprising: display means for displaying data from a buffer of a data processing system;

means for superimposing, on the displayed data, a representation having a relative size and location as the displayed data has with respect to the whole of said buffer;

means for interacting with the superimposed representation to scroll said buffer of data on said display means, wherein said means for interacting with said representation comprises a user-operable cursor positioning means for causing movement of a cursor, a user-operable preset scroll selector and preset scroll logic for causing scrolling of the buffer of data by a preset amount in a selectable direction in response to the position of the cursor with respect to said representation on operation of said preset scroll selector; and means for successively scrolling said buffer of data by successively operating said means for interacting without subsequent movement of said cursor.

2. A tool for displaying data, said tool comprising:

display means for displaying data from a buffer of a data processing system;

means for superimposing, on the displayed data, a representation having a relative size and location as the displayed data has with respect to the whole of said buffer;

means for interacting with the superimposed representation to scroll said buffer of data on said display means; and means for scrolling in a selected direction in a plurality of different preset amounts dependent upon a cursor position with respect to the superimposed representation.

3. A tool for displaying data, said tool comprising:

display means for displaying data from a buffer of a data processing system;

means for superimposing, on the displayed data, a representation having a relative size and location as the displayed data has with respect to the whole of said buffer;

means for interacting with the superimposed representation to scroll said buffer of data on said display means;

means for scrolling in a selected direction in a plurality of preset amounts dependent upon a cursor position with respect to the superimposed representation; and means for logically dividing the display means into a plurality of regions defined with respect to said representation, and for displaying the cursor which indicates, in each of said regions, the direction of scrolling.

4. A method for representing data, said method comprising the steps of:

displaying data, from a buffer, on a display means;

superimposing, on the displayed data, a representation representative of the size and location of said displayed data with respect to the whole of said buffer;

interacting with the superimposed representation to scroll said buffer within said display means, comprising the substep of responding to an operation of a user-operable preset scroll selector to cause scrolling of the buffer of data by a preset amount in a selectable direction in response to the position of the cursor with respect to said scroll box on operation of said preset scroll selector; and successively scrolling said buffer of data by successively interacting without subsequent movement of said cursor.

5. A method for representing data, said method comprising the steps of:

displaying data, from a buffer, on a display means;

superimposing, on the displayed data, a representation representative of the size and location of said displayed data with respect to the whole of said buffer;

interacting with the superimposed representation to scroll said buffer within said display means; and scrolling in a selected direction a plurality of different preset amounts dependent upon a cursor position with respect to the superimposed representation.

6. A method for representing data, comprising the steps of:

displaying data, from a buffer, on a display means;

superimposing, on the displayed data, a representation representative of the size and location of said displayed data with respect to the whole of said buffer;

interacting with the superimposed representation to scroll said buffer within said display means;

scrolling in a selected direction a plurality of preset amounts dependent upon a cursor position with respect to the superimposed representation; and logically dividing the display means into a plurality of regions defined with respect to said representation and for displaying the cursor which indicates, in each of said regions, the direction of scrolling.

7. A tool for displaying data, said tool comprising:

a display system having a display means for displaying data from a buffer of a data processing system;

a two dimensional representation;

means for superimposing the two dimensional representation on said displayed data;

means for positioning the representation within said displayed data to represent a relative position of the displayed data with respect to the buffer of data;

means for repositioning the superimposed representation, comprising means for receiving a first event driven action within said representation for scrolling the data in a first amount, and means for receiving a second event driven action outside the representation for scrolling the data in a second amount; and means, responsive to said repositioning means, for displaying a different portion of data having a data position with respect to said buffer as a position of the repositioned representation has within said displayed data.

8. A method for representing data, said method comprising:

displaying data from a buffer of a data processing system;

representing an amount of the displayed data with respect to the buffer of data in a two dimensional representation;

superimposing said two dimensional representation on said displayed data;

sizing the representation with respect to the displayed data in relation to the displayed data size and the size of the buffer;

positioning the superimposed representation to represent a relative position of the displayed data with respect to the buffer of data;

repositioning the superimposed representation, comprising receiving a first event driven action within said representation for scrolling the data in a first amount, and receiving a second event driven action outside the representation for scrolling the data in a second amount; and displaying a different portion of data having a data position with respect to said buffer as a position of the repositioned representation has within said displayed data.

* * * * *